United States Patent [19]

Wu et al.

[11] 4,334,045

[45] Jun. 8, 1982

[54] LOW COLOR COMPOSITIONS COMPRISING A CROSS-LINKED POLYCYANURATE POLYMER AND A THERMOPLASTIC POLYMER

[75] Inventors: Tse C. Wu; Dusan C. Prevorsek; David H. Wertz, all of Morristown, N.J.

[73] Assignee: Allied Corporation, Morristown, N.J.

[21] Appl. No.: 213,530

[22] Filed: Dec. 5, 1980

[51] Int. Cl.$^3$ .................. C08L 69/00; C08L 67/02
[52] U.S. Cl. .................. 525/439; 260/DIG. 35; 427/379; 525/452
[58] Field of Search .................. 525/439, 452; 260/DIG. 35; 427/379

[56] References Cited

U.S. PATENT DOCUMENTS

| | | | |
|---|---|---|---|
| 3,840,578 | 10/1974 | Hennig | 260/453 SP |
| 4,026,913 | 5/1977 | Tanigaichi et al. | 260/463 |
| 4,046,796 | 9/1977 | Rotloff et al. | 260/463 X |
| 4,157,360 | 6/1979 | Prevorsek et al. | 260/860 |

OTHER PUBLICATIONS

V. V. Korshak et al., Vysokomol, soyed. A16, No. 1, pp. 15-23, 1974, (esp. p. 17).
V. V. Korshak et al., Vysokomol, soyed. A17, No. 1, pp. 23-27, 1975, (esp. p. 29).
V. V. Korshak et al., Doklady Akademii Nauk SSSR, vol. 202, No. 2, pp. 347-350, (1972).

*Primary Examiner*—Theodore E. Pertilla
*Attorney, Agent, or Firm*—Alan M. Doernberg; Gerhard H. Fuchs

[57] ABSTRACT

A monomeric aromatic dicyanate is purified to remove color forming impurities, combined with a zinc salt catalyst and cured first below 200° C. and then for a limited time at or above 200° C., either alone or in admixture with or on a thermoplastic polymer. For example, purified 2,2-bis(4-cyanatophenyl)propane is purified, combined with a poly(ester carbonate) and zinc chloride, and then cured at increasing temperatures from 150° C. to 250° C.

28 Claims, No Drawings

LOW COLOR COMPOSITIONS COMPRISING A CROSS-LINKED POLYCYANURATE POLYMER AND A THERMOPLASTIC POLYMER

Aromatic dicyanates are a known class of thermosetting monomers which trimerize on heating and/or upon the action of a variety of catalysts to form branched polymers having s-triazine linkages (sometimes called polycyanurates or cross-linked cyanurates). Such aromatic dicyanates, including 2,2-bis(4-cyanatophenyl)-propane [dicyanato derivative of bisphenol A or bisphenol A dicyanate or BCP], are commercially available in moderately pure forms as monomers or oligomers with molecular weights of about 2000. A representative process for preparing such monomers is described in U.S. Pat. No. 4,046,796 to Rottloff et al. by a reaction of bisphenol A and similar bisphenols with a cyanogen halide in isopropanol with a tertiary amine catalyst.

It is known that aromatic dicyanates such as BCP can be heated or catalyzed by zinc chloride or other catalysts to set as a cross-linked polymer which is reasonably translucent, but quite yellow or brown in color. U.S. Pat. No. 4,026,913 to Tanigaichi et al. describes the polymerization of polycarbonates having hydroxy ends converted to dicyanato ends by cyanogen halide which are then polytrimerized with themselves or with monomeric aromatic dicyanates such as BCP to form cross-linked resins. Again, such compositions may be reasonably translucent but are normally quite yellow or brown in color.

U.S. Pat. No. 4,157,360 to Prevorsek and Chung describes thermoformable polymers which are an intimate mixture of a cross-linked polycyanurate network polymer and high molecular weight thermoplastic polymer such as a poly(ester carbonate). It is described that intimate mixtures of aromatic dicyanate monomers such as BCP with thermoplastic polymers such as poly(ester carbonates) can be set in fashions conventional for aromatic dicyanates to form interpenetrating network polymers of the thermoplastic finely dispersed in the cross-linked polycyanurate. While this patent describes such materials as having high impact strength, high Vicat softening temperature and good tensile properties, there is no description in the reference of the optical properties of the interpenetrating network polymer. Uses proposed for the interpenetrating network polymer include windscreens such as windshields, canopies, door windows and wire housings. In addition, it is described to deposit the interpenetrating network polymer as a coating on an article such as a wire, a conducting material, glass, poly(ester carbonate) windshield and structural parts such as supporting beams. It is indicated that the cured composition will improve the abrasion and solvent resistance of the article.

For many applications of polycyanurates, and especially of polycyanurate networks with thermosetting polymers dispersed therein as described in U.S. Pat. No. 4,157,360, it is desirable that the polycyanurate not detract from the optical properties of either the thermosetting material dispersed therein or the substrate upon which the network is deposited. In this regard, conventional polycyanurates contribute excessive color that detracts from their use in windscreens and the like, even as a thin coating deposited on glass or on clear plastics such as polycarbonates and poly(ester carbonates).

BRIEF DESCRIPTION OF THE INVENTION

It has been discovered that careful purification of the aromatic dicyanate monomer can remove materials that contribute color to the polycyanurate network, and especially to the interpenetrating network of thermoplastic polymer dispersed in polycyanurate network. It has also been discovered that the selection of curing catalyst is critical in avoiding color formation. It has been further discovered that the dicyanate should be initially cured at between about 150° and 200° C. to avoid color formation as occurs if cure is initiated above about 200° C., and that cure time at higher temperatures (especially above 200° C.) should be limited.

Accordingly, the present invention includes a process for preparing a cured composition which comprises:
(a) purifying a monomeric aromatic dicyanate to remove color-forming impurities;
(b) combining the purified aromatic dicyanate with an effective amount of a zinc salt and with a thermoplastic polymer;
(c) curing the aromatic dicyanate initially at at least one temperature at least about 150° C. and below about 200° C.; and
(d) further curing the aromatic dicyanate at at least one temperature between about 200° C. and about 300° C., for a time sufficient to cure the dicyanate without causing such color formation that the Yellowness Index of the cured composition exceeds about 30.

The present invention also includes a process for preparing a cured composition which comprises:
(a) purifying a monomeric aromatic dicyanate;
(b) combining the purified aromatic dicyanate with an effective amount of a zinc salt;
(c) curing the aromatic dicyanate initially at at least one temperature at least about 150° C. and below about 200° C.; and
(d) further curing the aromatic dicyanate at at least one temperature between about 200° C. and about 300° C., for a time sufficient to cure the dicyanate without causing such color formation that the Yellowness Index of the cured composition exceeds about 30.

A preferred method of conducting the purification step (a) is to recrystallize the monomeric aromatic dicyanate repeatedly with a ketone having a melting point below −25° C. without warming above 35° C. In both methods, the permissable times for the further curing step (d) is relatively short (usually under one hour) at a temperature slightly above 200° C. and becomes increasingly shorter as higher temperatures are employed.

DETAILED DESCRIPTION OF THE INVENTION

Some forms of the present invention relate to materials formed by curing an aromatic dicyanate in admixture with a thermoplastic in the manner of U.S. Pat. No. 4,157,360 or the aromatic dicyanate coated on a thermoplastic or the mixture coated on the same or a different thermoplastic. Other forms of the invention relate to the material formed by curing the aromatic dicyanate alone. The following discussion centers upon the mixture alone or on a thermplastic, but would apply similarly to the product of curing the pure dicyanate, except that permissable times for further curing are generally shorter for the pure dicyanate.

Monomeric dicyanates useful in the present invention include those of the formula NCO—R—OCN as described in U.S. Pat. No. 4,157,360 in columns 3-5. Preferred dicyanates are those wherein R is one of the following:

(a) diphenol moiety;
(b) diphenolester moiety, formed from aromatic dicarboxylic acid and diphenol;
(c) diphenolcarbonate moiety, formed from diphenol and carbonate precursor;
(d) diphenolestercarbonate moiety, formed from aromatic dicarboxylic acid, diphenol and carbonate precursor; or mixtures thereof.

Most preferred are those wherein R is

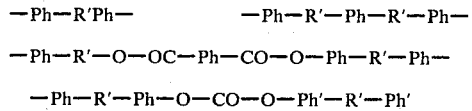

—Ph—R'Ph—         —Ph—R'—Ph—R'—Ph—

—Ph—R'—O—OC—Ph—CO—O—Ph—R'—Ph—

—Ph—R'—Ph—O—CO—O—Ph'—R'—Ph'

It is preferred in these formulas that Ph be 1,4-phenylene and R' be 2,2-propylidine; although Ph may also be 1,3 phenylene and R' may also be 4,4-phthalein, methylene, —O— or —SO$_2$—.

The dicyanate monomer used in the present invention should be purified before curing or mixing with thermoplastic. A preferred method of purification is recrystallization with a ketone having melting point below −25° C., such as acetone or methyl ethyl ketone. The recrystallization is best done without warming to temperatures where any substantial trimerization occur, e.g. without exceeding 35° C. Other purifications, such as by recrystallizing in a hydrocarbon, may be employed with similar results, except that greater care must be exercised to avoid temperatures warm enough for the impurities to catalyze polymerization and color formation.

The zinc salts used may be zinc chloride, a zinc alkanoate such as zinc octoate or any other conventional organic or inorganic zinc salt effective for trimerization of dicyanates. Zinc salts give better cure with less color than amine catalysts. The amount of zinc salt depends on the rate of polymerization desired, but generally levels of 0.001% to 0.1% zinc by weight of dicyanate are effective.

If a thermoplastic is used, it can be any thermoplastic, but preferably is one that does not react with the dicyanate, and also preferably contains at least some aromatic moieties.

If the dicyanate is to be combined with a thermoplastic before curing, then in some methods they are mixed as dry solids with the zinc salt. In this case the weight ratio of mixed dicyanate to mixed thermoplastic is preferably about 1:9 to about 9:1. The mixture may be applied to the same or different thermoplastic before curing and then cured as described below.

Alternatively the mixture of purified aromatic dicyanate, zinc salt and thermoplastic polymer may be coprecipitated from a solution thereof in a solvent for all three such as trichloroethane. The solvent may be removed before curing by evaporating at a temperature below either cure temperature or during the cure by heating to the first cure temperature (e.g. 175° C.) and evaporating the solvent. In the latter case, the cure time (generally 0.1-2 h) should be considered to start after the solvent has essentially all evaporated. Where coprecipitation is employed, the weight ratio coprecipitated dicyanate to coprecipitated thermoplastic is preferably between about 1:9 and about 9:1. In some forms the coprecipitated dicyanate, zinc salt and thermoplastic polymer (or dicyanate and zinc salt without the thermoplastic polymer) are applied to a thermoplastic substrate before curing, but they may also be applied to other substrates or coprecipitated without a substrate. If applied or coprecipitated on a substrate, the cure generally follows the coprecipitation or application.

The purified aromatic dicyanate and thermoplastic polymer may also be melt blended before curing, generally with the zinc salt added with one of the two melts. To avoid curing of the dicyanate before melt blending is completed, it is preferred that the powdered thermoplastic polymer be mixed with a major proportion (e.g. 90%) of the total purified aromatic dicyanate used and then heated to elevated temperatures (e.g. 200° to 230° C.) with mixing. When the mixture becomes homogeneous, the zinc salt is then added with the remaining aromatic dicyanate (e.g. 10%) with mixing at a temperature low enough to complete mixing before the material sets (e.g. 200° C.). It is preferred to employ the melt blending technique with a zinc level at the low end of the overall range indicated above to minimize premature cure. The weight ratio of melt blended dicyanate to melt blended thermoplastic is preferably between about 1:9 and about 9:1. Once melt blended, the material may be applied to a thermoplastic substrate, or other substrate such as a wire, before curing.

In all forms of the invention in which a mixture of aromatic dicyanate, thermoplastic polymer and zinc salt are applied to a thermoplastic substrate, many preferred forms are those in which the thermoplastic polymer and thermoplastic substrate are formed from the same monomers. This similarity can improve compatability and adhesion. The monomers may be present in the same or similar proportion, but this is not required. The polymer and substrate may be of similar molecular weights, monomer distributions or degrees of branching, but this is not required.

Preferred thermoplastics used either for admixture with the purified aromatic dicyanate, for use as the thermoplastic substrate or for both are aromatic polyesters, aromatic polycarbonates, aromatic poly(ester carbonates) and aromatic polysulfones. More preferred are the aromatic polycarbonates and poly(ester carbonates) (also called polyester carbonates). Preferred poly(ester carbonates) include those formed from phosgene, bisphenol A and a monomer selected from the group consisting of terephthalic acid, terephthaloyl chloride, isophthalic acid, isophthaloyl chloride and mixture thereof. The monomer is preferably terephthaloyl chloride. Preferred poly(ester carbonates) also include those formed from phosgene, bisphenol A, phenolphthalein, and terephthalic acid or terephthaloyl chloride. With poly(ester carbonates) including the preferred ones, the most preferred aromatic dicyanate is 2,2-bis(4-cyanatophenyl)propane ("BCP").

In general it is preferred that the weight ratio of combined aromatic dicyanate to thermoplastic polymer be between about 9:1 and about 1:9, with between about 2:1 and about 1:2 being more preferred.

The curing process used in the present invention, whether or not a thermoplastic polymer or substrate is present, should include cure at at least one temperature at least about 150° C. and below about 200° C., which may be quite short (e.g. 5-10 minutes) or quite long (e.g. several hours), but is preferably in the range of 30 minutes to 2 hours. It is contemplated to apply additional material and repeat the low temperature cure. Following the low temperature cure, the dicyanate-containing mixture should be cured at at least one temperature between about 200° C. and 300° C. The times for this second cure depend upon the system being cured, the temperature chosen, the color level desired and the desired degree of curing to achieve a particular hardness, abrasion resistance, mar resistance or other physical property. Generally less than 3 h and more than 1 min total cure time above 200° C. is employed.

As shown by Examples 11 and 12, performing a high temperature cure without first performing a low temperature cure increases the discoloration of the thermoplastic. Material which has undergone both cures is also more cured, and thus has better physical properties, than material that has undergone only the same high temperature cure.

As indicated by several of the Examples, and especially Examples 38-50, the longer the further curing above about 200° C., the more yellow the cured composition becomes. Since, however, curing occurs faster at these temperatures than color formation (provided that the other steps are followed such as aromatic dicyanate purification and initial cure below about 200° C.), a limited time is available to obtain desirable physical properties without excessive color formation. In many cases these physical properties are equal to the physical properties of highly colored materials which have cured for significantly longer times.

The improved optical properties of materials prepared in accordance with the present invention can be observed by determining a Yellowness Index in accordance with ASTM D1925-70. The physical properties can be measured by a variety of techniques, but for the coatings are generally determined by the Mar Resistance Of Plastics or Falling Grit test of ASTM D673. Other properties such as solvent resistance should also improve as the degree of cure increases. For any system trade-offs between better physical properties and inceased yellowness are encountered. In general, however, either improved physical properties with equivalent optical properties or improved optical properties with equivalent physical properties are achieved with the recrystallization and two-stage cure steps (including limited time above about 200° C.) of the present invention, compared to methods in which one or more of these are not employed.

EXAMPLES 1-10

Samples of 2,2-bis(4-cyanatophenyl)propane (BCP) were placed in an aluminum dish to a level of about 1/16 inch (1.6 mm). Catalyst was added as indicated in Table 1. The dish was then heated in an oven at 150° C. for one hour and then 200° C. for two hours. Yellowness indices (YI1) were then measured by ASTM D1925-70 as indicated in Table 1. Thereafter the plaques were cured at 250° C. for thirty minutes. Yellowness indices (YI2) was then measured.

The BCP used in Examples 1 and 4-9 was purified by dissolving in acetone at room temperature, then filtering the solution and cooling it in dry ice, filtering the crystals at −60° C. and washing with −60° C. acetone. This process was usually repeated several (3-5) times. BCP used in later examples (11-54) was similarly purified.

TABLE 1

| Example | BCP | Catalyst | Level | YI1 | YI2 |
|---|---|---|---|---|---|
| 1 | P | — | — | 62.3 | 86.8 |
| 2 | M | — | — | 35.0 | 81.0 |
| 3 | O | — | — | 30.4 | 75.9 |
| 4 | P | ZnOc | 0.008%* | 26.5 | 58.3 |
| 5 | P | ZnCl | 0.048%* | 13.6 | 41.3 |
| 6 | P | Cat | 0.1% | 69.4 | 91.6 |
| 7 | P | EMI | 0.1% | 78.8 | 100.7 |
| 8 | P | TED | 0.1% | ** | 77.2 |
| 9 | P | Cat | 0.1% | 42.0 | 86.2 |
|  |  | EMI | 0.1% |  |  |
|  |  | TED | 0.1% |  |  |
| 10 | M | ZnOc | 0.008%* | 52.7 | 77.0 |

| | | |
|---|---|---|
| M | BCP | monomer as received from Mobay Chemical |
| O 70% | BCP | oligomer with 30% methyl ethyl ketone as received from Mobay Chemical |
| P | BCP | monomer purified by recrystallization in acetone |
| ZnOc | zinc octoate | |
| ZnCl | zinc chloride | |
| Cat | catechol | |
| EMI | ethylmethylimidazole | |
| TED | triethylenediamine | |
| * | as Zn | |
| ** | material not solid after first treatment | |

The higher yellowness indices for Example 1 compared to Example 2 can be explained by the removal of certain impurities during purification which are themselves catalytic. The superiority of Examples 4 and 5 evidences the superiority of zinc catalysts over these impurities or other added catalysts.

EXAMPLES 11 AND 12—EFFECT OF LOW TEMPERATURE CURE

Using the purified BCP and 0.008% Zn as zinc octoate, two plaque were made. The first was initially cured at 200° C. for 30 minutes. It had a yellowness index of 88.4. The second was cured first at 150° C. for 30 minutes and then at 200° C. for 30 minutes. It showed a yellowness index of 10.1. Thus discoloration at 200° C. occurs far less if the initial cure is below 200° C.

EXAMPLES 13-16—COMPARISON OF ZINC CATALYSTS

Four plaques were prepared of purified BCP and 0.01% zinc as zinc chloride or zinc octoate. The first two were subjected to cure at 150° C. for 60 minutes, then 200° C. for 30 minutes (then YI1 measured), then 200° C. for 120 minutes (then YI2 measured), and then 250° C. for 120 minutes (and then YI3 measured). The results were:

| Example | Catalyst | YI1 | YI2 | YI3 |
|---|---|---|---|---|
| 13 | 0.01% ZnCl | 2.8 | 21.4 | 53.4 |
| 14 | 0.01% ZnOc | 9.5 | 27.0 | 64.1 |

The other two were cured at 140° C. for 120 minutes, then 170° C. for 120 minutes and then 250° C. for 120 minutes. The results were:

| Example | Catalyst | YI |
|---|---|---|
| 15 | ZnCl | 47.0 |
| 16 | ZnOc | 79.4 |

Under these regimes, zinc chloride outperformed zinc octate.

EXAMPLES 17-23—VARIOUS FINAL CURES

Seven plaques of purified BCP with 0.01% zinc as zinc chloride were cured at 150° C. for 60 minutes, then 200° C. for 30 minutes. The first three plaques were then cured for varying times at 250° C. The last three plaques were then cured for 5 minutes at varying temperatures. The results are shown in Table 2.

TABLE 2

| Example | Cure after 200° C. | YI |
| --- | --- | --- |
| 17 | 250° C. for 5 min. | 14.6 |
| 18 | 250° C. for 10 min. | 21.4 |
| 19 | 250° C. for 15 min. | 29.6 |
| 20 | none | 7.7 |
| 21 | 250° C. for 5 min. | 10.5 |
| 22 | 275° C. for 5 min. | 28.4 |
| 23 | 300° C. for 5 min. | 45.5 |

These results indicate a rapid increase in color at 250° C. and a more rapid increase at higher temperatures. Nevertheless, if a high degree of cure is required, these short high temperature cures may be desired after precuring at lower temperatures.

EXAMPLES 24-26

Three samples of acetone-purified BCP were mixed with zinc chloride (0.01% Zn) and heated in aluminum dishes for two hours at 150° C., one hour at 200° C. and thirty minutes at 250° C. One was then heated for fifteen minutes at 275° C. Another was heated at 275° C. and 300° C. for fifteen minutes each. All three were then measured for haze value, and then subjected to a test for Mar Resistance Of Plastics Using 1000 mL of falling grit as described at ASTM D-673. Changes in value were:

| Example | Highest Cure | Haze Change |
| --- | --- | --- |
| 24 | 250° C. | 46.7 |
| 25 | 275° C. | 53.5 |
| 26 | 300° C. | 44.3 |

These results suggest that here short cures at higher temperatures had no substantial effect on the scratch resistance of pure BCP.

EXAMPLES 27-54

In the following examples PEC refers to a poly(ester carbonate) formed from terephthaloyl chloride, phosgene and biphenol A (1:1:2) as described in U.S. Pat. No. 4,156,069. PECP refers to a similar poly(ester carbonate) in which 20% of the bisphenol A is replaced by phenolphthalein as described in copending application 133,228 of DeBona et al. filed Mar. 24, 1980. DDP refers to dicyanatodicumyl phenol. BCP refers to 2,2-bis(4-cyanatophenyl)propane purified by repeated recrystalizations in acetone as in Example 1.

EXAMPLE 27

A PEC plaque with the dimension of 3 by 3 by 1/16 inch (76 by 76 by 1.6 mm) was coated with 1.7 g of a 20% solution containing 50% BCP, 50% PEC and zinc octoate (0.008% Zn based on BCP) dissolved in sym-tetrachloroethane (TCE). The amount of coating material was calculated to provide approximately 50 μm thickness on the PEC substrate.

The coated plaque was heated consecutively at 130°, 165°, 200°, and 250° C. for 2 hours each. The product thus obtained was found to be free of delamination after 2 hours of immersion in boiling water. The mar resistance by falling grit method showed that the haze increased 41.8% (from 6.5% to 48.3%) after 1000 mL of grit had been used to abrade the coated surface.

EXAMPLE 28

In another experiment, a plaque was coated with 50/50 BCP/PEC and cured at 130° and 165° C. for 2 hours each. It was coated a second time with the same amount of 50/50 BCP/PEC and cured at 130°, 165°, 200°, and 250° C. for 2 hours each, followed by a 15-minute treatment at 300° C. Using the same mar resistance test described above the increase in haze was 35.1% (from 20.3% to 55.4%).

EXAMPLE 29

Similarly, when Example 28 was repeated except that the second coating consisted of 75/25 BCP/PEC instead of 50/50 composition, the increase in haze was 26.9% (18.2% to 45.1%).

EXAMPLE 30

A PEC plaque was coated in a similar fashion as that described in Example 28 using with a 50/50 DDP/PEC instead of using a 50/50 BCP/PEC coating material. The increased haze was 48.1% (from 3.2% to 51.3%).

EXAMPLE 31

A PEC plaque coated with a 50/50 BCP/PECP was processed in the same fashion as that described in Example 28. The increased haze was found to be 36.1% (from 12.0% to 48.1%).

EXAMPLE 32

A PECP plaque was coated with a 50/50 BCP/PECP in the manner of Example 28. The increased haze was 24.7 (from 23.8 to 48.5) for the coated material and 33.3 (From 8.5 to 41.8) for the uncoated material.

EXAMPLE 33

A polycarbonate (LEXAN from General Electric) of bisphenol A was formed into a plaque and coated with 50/50 BCP/PEC in the manner of Example 28. The increased haze was 36.0 (from 16.8 to 52.8) for the coated material and 64.0 (from 1.5 to 66.0) for the uncoated material.

EXAMPLE 34

A polysulfone (UDEL from Union Carbide) was formed into a plaque and coated with 50/50 BCP/PEC in the manner of EXAMPLE 28. The increased haze was 29.5 (from 15.3 to 54.8) for the coated material and 69.8 (from 5.3 to 75.1) for the uncoated polysulfone.

EXAMPLES 35-37

In this experiment the coating material was the same as in Example 28 except that zinc chloride (0.01% Zn) was used instead of zinc octoate. The coated plaques was cured at 150° C. for 120 minutes plus 200° C. for 60 minutes plus 250° C. for 30 minutes. In addition, one plaque was heated at 275° 1 C. for 15 minutes, and another was further heated at 300° C. for 15 minutes. The haze increases after 1000 mL falling grit were:

| Last Curing Condition | Haze Increase |
|---|---|
| 250° C. for 30 minutes | 44.4 (5.4 to 49.8) |
| 275° C. for 15 minutes | 50.0 (3.7 to 53.7) |
| 300° C. for 15 minutes | 41.6 (16.8 to 58.4) |

EXAMPLES 38-39

Two plaques were prepared with BCP and zinc chloride at a level of 0.022% Zn. Both were heated at 150° C. For 1 h and 200° C. for 2 h. One was further heated at 250° C. for 4 h. The yellowness index for the plaque heated at 250° C. was 82.7, while the yellowness index of the plaque not heated at 250° C. was 22.0. This indicates the undesirability of excessive curing above 200° C.

EXAMPLES 40-45

Six plaques were prepared with BCP and zinc chloride at a level of 0.01% Zn. All six were then cured at 130° C. for 2 h, 165° C. for 2 h and 200° C. for 2 h. Five of the plaques were further cured at 250° C. for 0.25 to 4 h. The yellowness indexes were:

| Example | Time at 250° C. | Yellowness Index |
|---|---|---|
| 40 | 0 | 22.0 |
| 41 | 0.25 | 36.6 |
| 42 | 0.5 | 43.0 |
| 43 | 1 | 51.8 |
| 44 | 2 | 63.2 |
| 45 | 4 | 79.0 |

These results show that, for pure dicyanate without thermoplastic, significant color formation occurs in under one hour at 250° C., with color continuing to increase thereafter.

EXAMPLES 46-50

Examples 40-45 were repeated for five plaques with initial cure conditions of 150° C. for 1 h and 200° C. for 0.5 h. Four of the plaques were cured further for 0.5-6 h at 250° C. as indicated:

| Example | Time at 250° C. | Yellowness Index |
|---|---|---|
| 46 | 0 | 4.2 |
| 47 | 0.5 | 32.8 |
| 48 | 1 | 45.4 |
| 49 | 3 | 71.5 |
| 50 | 6 | 96.5 |

A comparison of Example 46 with Example 40 indicate that some color formation occurred at 200° C. between the 0.5 h of Examples 46-50 and the 2 h of Examples 40-45. Examples 47-50 show that color formation occurred quickly at 250° C., but color levels remained lower than in corresponding examples within the 200° C. cure was longer: Example 47 compared to 42, Example 48 compared to 43.

EXAMPLES 51-54

Four PEC plaques (76 by 76 by 1.6 mm) were cleaned with hexane and then isopropanol. On each was placed 1.7 g of a 20% solution of equal parts BCP and PEC by weight and 0.01% zinc chloride (by Zn as a percentage of BCP) in sym-tetrachloroethane. After the solution was spread evenly, the plaques were heated in an oven at 120° C., 165° C. and 200° C. for 2 h each and then at 250° C. for 0.5 to 4 h as indicated, producing plaques with the indicated yellowness indexes:

| Example | Time at 250° C. | Yellowness Index |
|---|---|---|
| 51 | 0.5 | 13.3 |
| 52 | 1 | 17.1 |
| 53 | 2 | 32.4 |
| 54 | 4 | 56.6 |

These results suggest that the mixture coated on thermoplastic formed color in a more linear fashion than the pure dicyanate used in Examples 40-50.

We claim:

1. A process for preparing a cured composition which comprises:
    (a) purifying a monomeric aromatic dicyanate to remove color forming impurities;
    (b) combining the purified aromatic dicyanate with an effective amount of a zinc salt and with a thermoplastic polymer;
    (c) curing the aromatic dicyanate at at least one temperature at least about 150° C. and below about 200° C.; and
    (d) further curing the aromatic dicyanate at at least one temperature between about 200° C. and about 300° C., for a time sufficient to cure the dicyanate without causing such color formation that the Yellowness Index of the cured composition exceeds about 30.

2. The process of claim 1 wherein the purified dicyanate, zinc salt and thermoplastic polymer are mixed as dry solids before curing and the weight ratio of mixed dicyanate to mixed thermoplastic is between about 1:9 and about 9:1.

3. The process of claim 2 wherein the mixture of dicyanate, zinc salt and thermoplastic polymer is applied to a thermoplastic substrate before curing.

4. The process of claim 1 wherein the purified aromatic dicyanate, zinc salt and thermoplastic polymer are coprecipitated from a solution, the solvent is removed before or during curing and the weight ratio of coprecipitated dicyanate to coprecipitated thermoplastic is between about 1:9 and about 9:1.

5. The process of claim 4 wherein the coprecipitated dicyanate, zinc salt and thermoplastic polymer are applied to a thermoplastic substrate before curing.

6. The process of claim 1 wherein the purified aromatic dicyanate and thermoplastic polymer are melt blended before curing and the weight ratio of melt blended dicyanate to melt blended thermoplastic is between about 1:9 and about 9:1.

7. The process of claim 6 wherein the melt blended dicyanate, zinc salt and thermoplastic polymer are applied to a thermoplastic substrate before curing.

8. The process of claim 3 or 5 or 7 wherein the thermoplastic polymer and thermoplastic substrate are formed from the same monomers.

9. The process of claim 1 wherein said combining step (b) comprises mixing the dicyanate and zinc salt and applying the mixture to a substrate of the thermoplastic polymer.

10. The process of claim 1 wherein the dicyanate is purified by recrystallizing with a ketone having a melting point above −25° C. without warming above 35° C.

11. The process of claim 1 wherein the aromatic dicyanate monomer is of the formula NCO—R—OCN wherein R comprises at least one aromatic moiety and contains 6–40 carbons, in which the aromatic rings may be further substituted by groups, inert during the polymerization, selected from halogen, alkyl of 1–4 carbons, alkoxy of 1–4 carbons and alkyl carboxylic ester of 1–4 carbons.

12. The process of claim 11 wherein R of said compound is a:
(a) diphenol moiety;
(b) diphenolester moiety, formed from aromatic dicarboxylic acid and diphenol;
(c) diphenolcarbonate moiety, formed from diphenol and carbonate precursor;
(d) diphenolestercarbonate moiety, formed from aromatic dicarboxylic acid, diphenol and carbonate precursor; or mixture thereof.

13. The process of claim 12 wherein R is:

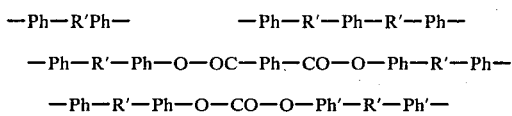

—Ph—R'—Ph—O—CO—O—Ph'—R'—Ph'— or mixtures thereof; wherein Ph is, independently at each occurrence, 1,4-phenylene or 1,3-phenylene and R' is, independently at each occurrence, 2,2-propylidene or 4,4-phthalein.

14. The process of claim 13 wherein Ph is a 1,4-phenylene at each occurrence and R' is 2,2-propylidene.

15. The process of claim 14 wherein said thermoplastic polymer is a polyester carbonate.

16. The process of claim 15 wherein said polyester carbonate is formed from phosgene, bisphenol A and a monomer selected from the group consisting of terephthalic acid, terephthaloyl chloride, isophthalic acid, isophthaloyl chloride and mixture thereof.

17. The process of claim 16 wherein the monomer is terephthaloyl chloride.

18. The process of claim 15 wherein said polyester carbonate is formed from phosgene, bisphenol A, phenolphthalein, and terephthalic acid or terephthaloyl chloride.

19. The process of claim 15, 16, 17 or 18 wherein said aromatic dicyanate is 2,2-bis(4-cyanatophenyl)propane.

20. The process of claim 1, 11, 15, 16 or 17 wherein said aromatic dicyanate and thermoplastic polymer are combined in a weight ratio between about 9:1 and about 1:9.

21. The process of claim 20 wherein said weight ratio is between about 2:1 and about 1:2.

22. A process for preparing a cured composition which comprises:

(a) purifying a monomeric aromatic dicyanate to remove color forming impurities;
(b) combining the purified aromatic dicyanate with an effective amount of a zinc salt;
(c) curing the aromatic dicyanate at at least one temperature at least about 150° C. and below about 200° C.; and
(d) further curing the aromatic dicyanate at at least one temperature between about 200° C. and about 300° C., for a time sufficient to cure the dicyanate without causing such color formation that the Yellowness Index of the cured composition exceeds about 30.

23. The process of claim 22 wherein the aromatic dicyanate monomer is of the formula NCO—R—OCN wherein R comprises at least one aromatic moiety and contains 6–40 carbons, in which the aromatic rings may be further substituted by groups, inert during the polymerization, selected from halogen, alkyl of 1–4 carbons, alkoxy of 1–4 carbons and alkyl carboxylic ester of 1–4 carbons.

24. The process of claim 23 wherein R of said compound is a:
(a) diphenol moiety;
(b) diphenolester moiety, formed from aromatic dicarboxylic acid and diphenol;
(c) diphenolcarbonate moiety, formed from diphenol and carbonate precursor;
(d) diphenolestercarbonate moiety, formed from aromatic dicarboxylic acid, diphenol and carbonate precursor; or mixtures thereof.

25. The process of claim 24 wherein R is:

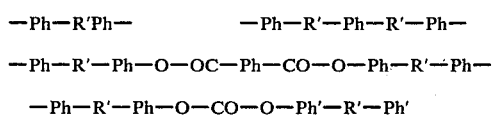

—Ph—R'—Ph—O—CO—O—Ph'—R'—Ph' or mixtures thereof; wherein Ph is, independently at each occurrence, 1,4-phenylene or 1,3-phenylene and R' is, independently at each occurrence, 2,2-propylidene or 4,4-phthalein.

26. The process of claim 25 wherein Ph is 1,4-phenylene and R' is 2,2-propylidene at each occurrence.

27. The process of claim 12 wherein the time of said further curing step is more than about one minute and less than three hours.

28. The process of claim 25 wherein the time of said further curing step is more than about one minute and less than three hours.

* * * * *